United States Patent

[11] 3,586,776

[72] Inventor Roger F. Salava
Arlington Heights, Ill.
[21] Appl. No. 816,654
[22] Filed Apr. 16, 1969
[45] Patented June 22, 1971
[73] Assignee Motorola, Inc.
Franklin Park, Ill.

[54] DIGITAL COMMUNICATION SYNCHRONIZATION SYSTEM INCLUDING SYNCHRONIZATION SIGNAL TERMINATION RECOGNITION MEANS
7 Claims, 2 Drawing Figs.

[52] U.S. Cl. .......... 178/69.5 R
[51] Int. Cl. .......... H04n 1/36
[50] Field of Search .......... 178/69.5; 179/15; 235/153; 340/146.1, SYNC

[56] References Cited
UNITED STATES PATENTS

| | | | |
|---|---|---|---|
| 2,949,503 | 8/1960 | Andrews, Jr. et al. | 178/69.5 |
| 3,057,962 | 10/1962 | Mann et al. | 178/69.5 |
| 3,315,228 | 4/1967 | Futerfas et al. | 340/146.1 |
| 3,466,601 | 9/1969 | Tong | 340/SYNC |
| 3,482,044 | 12/1969 | Kaneko | 178/69.5 |

*Primary Examiner*—Richard Murray
*Assistant Examiner*—George G. Stellar
*Attorney*—Mueller and Aichele

ABSTRACT: A shift register in a receiving unit uses a feedback to develop a digital code and the digital code is compared with an incoming digital code used to synchronize a digital communication signal. Initially the shift register is fed the incoming digital code signal. If the received and generated signals are in agreement an output signal is added in an integrator for each agreement. If the signals do not agree the output signal is subtracted from the signal stored in the integrator. When the signal stored in the integrator reaches a predetermined level a switching action occurs which connects the feedback output of the shift register to the input of the shift register so that the code is self-generating and errors in the incoming code will not be coupled into the shift register.

Inventor
ROGER F. SALAVA
By
Mueller, Aichele & Rauner
Attys.

DIGITAL COMMUNICATION SYNCHRONIZATION SYSTEM INCLUDING SYNCHRONIZATION SIGNAL TERMINATION RECOGNITION MEANS

BACKGROUND OF THE INVENTION

A basic problem in a synchronous digital transmission system is the derivation of a start of frame synchronization signal in the presence of noise. The Barker and similar synchronization codes must be fairly short to be practical and even the short codes require a stable integrator and threshold detector which raises the cost of the technique. Even these systems are not entirely satisfactory since in high speed digital systems 10—20 or more bits of the synchronization can be virtually wiped out because of fades of impulse noise bursts. This is particularly true in mobile communication systems which can operate in noisy environments as well as traveling in and out of areas which are subject to fading.

SUMMARY OF THE INVENTION

It is, therefore, an object of this invention to provide an improved digital synchronization system.

Another object of this invention is to provide a digital communication synchronization system which operates automatically and which will achieve synchronization in a high noise environment.

Another object of this invention is to provide a digital communication synchronization system which will provide synchronization when the synchronization signal is subject to fading.

In practicing this invention a pseudo-random synchronization signal is generated by the transmitting unit and transmitted to the receiving unit. The receiving unit uses a shift register with feedback to generate an identical pseudo-random synchronization code. The transmitted synchronization signal is coupled through a switching circuit to the input of the shift register and stepped through the shift register stages. The output of the shift register feedback circuit is compared with the incoming code and if the two codes are identical an output signal is coupled to an integrator and added to the quantity already stored in the integrator. If the two codes are different there is no addition to the quantity stored in the integrator and the quantity stored in the integrator is reduced. When the quantity stored in the integrator reaches a predetermined level, a level detector circuit develops an output signal. The output signal acts to actuate the switching circuit so that the transmitted synchronization signal is blocked from the shift register and the shift register is fed from its own self-generated signal. Thus, as long as the synchronization code is received correctly, the quantity in the integrator builds up and the receiver code-generating circuits operate without receiving a wrong digit. If the incoming code should be lost or errors occur because of noise, the quantity stored in the integrator is reduced. However, if good synchronization has been achieve the quantity stored in the integrator will not become low enough to actuate the level detector and the synchronization process will continue. At the end of the synchronization code each of the shift register stages has a predetermined bit of information stored therein. With the level detector output showing synchronization has been achieved, and with the predetermined information in each stage of the shift register, a synchronization start signal is developed and applied to the apparatus which is to utilize the digital communication signal.

The invention is illustrated in the drawings of which:

FIG. 1 is a block diagram illustrating the generation of the digital synchronization signal at the transmitting unit; and FIG. 2 is a block diagram illustrating the operation of the receiving unit digital synchronization system.

DETAILED DESCRIPTION OF THE INVENTION

Figure 1:
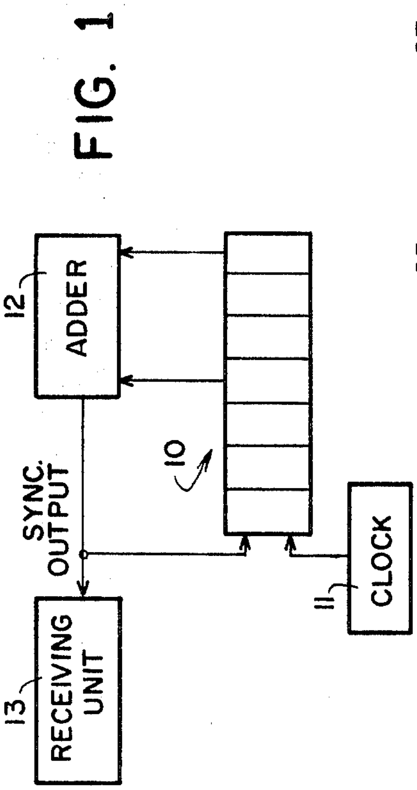

Referring to FIG. 1 there is shown a synchronization code generating circuit for the transmitting station. A shift register 10 having a plurality of stages is actuated by a clock 11 so that the bit in each stage is transferred to a succeeding stage for each clock signal. A plurality of these stages are coupled to a combiner 12 which combines the information stores in these stages to develop an input signal which is fed back into the first stage of shift register 10. This well-known technique develops a pseudo-random code signal which can be used for a synchronization signal. In this example each stage of the shift register can contain a bit so that the resulting signal is a binary number. The length of the code is determined by the number of stages in the shift register, the starting numbers in the shift register and the feedback used. The output of combiner 12 is the synchronization code and is transmitted to the receiving unit 13 in any well-known manner.

Figure 2:
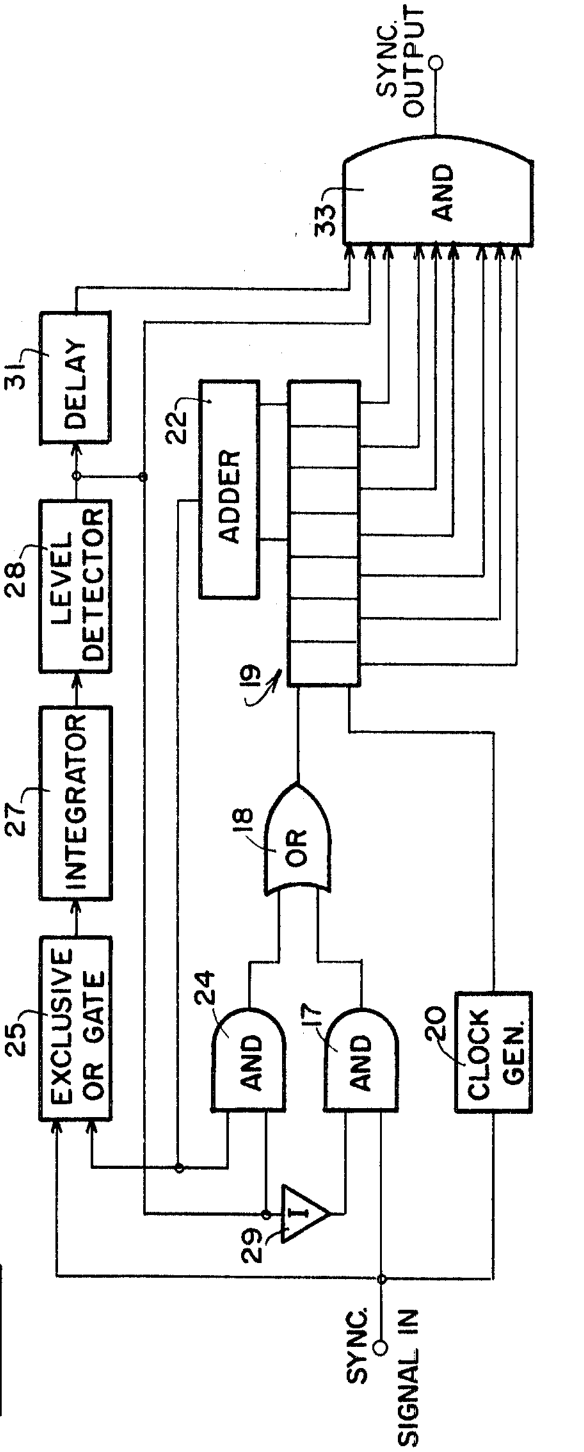

In FIG. 2 there is shown the synchronization system of this invention used in the receiving unit. The digital synchronization signal from the transmitting unit is received and coupled to exclusive OR gate 25, AND gate 17 and clock generator 20. Clock generator 20 develops a clock signal, in synchronism with the incoming digital signals, which is coupled to shift register 19 to step the shift register. Clock generator 20 contains its own clock signal-generating circuit so that the absence of a synchronizing signal for short periods of time will not affect the generation of an accurate clock signal.

The synchronizing signal is also coupled through AND gate 17 and OR gate 18 to the input of shift register 19. The clock signal from clock generator 20 steps the incoming synchronization signal through the shift register 19. A plurality of stages of shift register 19 are coupled together in combiner 22 which develops a local synchronizing signal which is coupled back to AND gate 24. This feedback arrangement is identical to the feedback arrangement in the transmitting unit so that if there are no errors in the incoming synchronization code the digital synchronization code from combiner 22 will be identical to that generated by shift register 10 and combiner 12 of FIG. 1.

At the beginning of synchronization signals applied to AND gates 17 and 24 act to disable AND gate 24 and enable AND gate 17 so that the initial signal applied to shift register 19 is the incoming digital synchronizing signal. If there are no errors in the incoming synchronizing signal the output of combiner 22 will be identical to the incoming synchronizing signal. The output of combiner 22 is also applied to exclusive OR gate 25 which develops a first output when both the signals applied thereto are identical and a second output when the signals applied thereto are different. The first output signal is coupled to integrator 27 and is added to the quantity stored in integrator 27. When a predetermined number of correct synchronizing signal digits have been received the quantity stored in integrator 27 reaches a predetermined level which is detected by level detector 28 to develop a control signal. The control signal is coupled to a delay circuit 31, AND gate 24 and inverter 29. The control signal acts to enable AND gate 24 and is inverted by inverter 29 to disable AND gate 17. At this point the pseudo-random code from combiner 22 is coupled to the input of shift register 19. Shift register 19 and combiner 22 act to generate the correct synchronizing code compared any incorrect digits which may be present in the received synchronization code are not coupled to shift register 19.

With AND gate 24 enabled and AND gate 17 disabled the output of combiner 22 is still compared in the exclusive OR gate 25 and the resulting first or second output signals are added or subtracted in integrator 27 increasing or decreasing the quantity stored in integrator 27. For example, integrator 27 may be an RC network which charges when a signal of a particular magnitude is applied thereto and which discharges when signal of a different magnitude is applied thereto. The output of exclusive OR gate 25 is one of two signals having different magnitudes according to whether the synchronizing signals applied thereto are the same or different. Thus, if synchronization is achieved over a large number of digits and at this point a large number of digits are received which are in error, the quantity stored in the integrator 27 is reduced but may not fall below the level detected by level detector 28. The receiving unit is able to continue generation of the synchronization signal without losing synchronization even though the received synchronization signal has been lost for a period of time.

If the errors are of such magnitude that synchronization lost the output from level detector 28 ceases, AND gate 24 is disabled and AND gate 17 is enabled so that the incoming synchronization signal is again coupled to shift register 19 to force feed the shift register and thereby achieve synchronization again. In a typical example, where the above system is used to synchronization a mobile teleprinter with a base-transmitting station, synchronization has been reliably obtained using a shift register having 7 stages and generating a 127 bit synchronization code. It has been found that during this period of synchronization the system can attempt to achieve synchronization three times and can maintain synchronization even though 20 or more bits of the synchronization code are wiped out.

The output of level detector 28 is also coupled to AND gate 33 and delay unit 31. The delayed output of delay unit 31 is connected to AND gate 33. The purpose of the delay is to prevent synchronization from occurring immediately upon the operation of level detector 28 so that a definite quantity must be established in integrator 27 before synchronization can be achieved.

Each of the separate stages of shift register 19 are coupled to AND gate 33 and when a predetermined code pattern has been achieved in shift register 19 (for example all ones) AND gate 33 is actuated to develop an output signal which signifies the start of synchronization. For example, in a mobile printer the start of synchronization signal could be used to start various circuits which receive the address and the data signal for printing.

I claim:

1. A system for digital communications synchronization, including in combination, transmission means for developing a first digital synchronizing signal and transmitting the same, receiver means for receiving said first digital synchronizing signal, said receiver means including, code generation means for developing a second digital synchronizing signal, comparing means coupled to said code generation means and adapted to receive said first and second digital-synchronizing signal, said comparing means being responsive to said first and second digital synchronizing signals to develop a first output signal with said first and second digital synchronizing signals being the same, and a second output signal with said first and second digital synchronizing signals being different, adding means coupled to said comparing means for adding said first output signals and subtracting said second output signals from the added signals to develop a first control signal, magnitude detection means coupled to said adding means and responsive to said first control signal greater than a predetermined magnitude to develop a synchronization control signal, and output AND gate means coupled to said code generation means and said magnitude detection means and responsive to said synchronization control signal and a particular portion of said second digital synchronizing signal to develop a synchronization start signal.

2. The digital communication synchronization system of claim 1 wherein, said transmission means includes first shift register means having a plurality of stages and an input stage, said code generation means includes second shift register means having a plurality of stages equal in number to said plurality of stages in said first shift register means and an input stage, first combining means coupled to at least two said stages of said first shift register means and responsive to the data stored therein to develop said first digital-synchronizing signal, said first combining means further being coupled to said input stage of said first shift register means for applying said first digital synchronizing signal thereto, second combining means coupled to the same stages of said second shift register means as said first combining means is coupled to said first shift register means, said second combining means being responsive to the data stored in the stages coupled thereto to develop said second digital synchronizing signal, and means coupling said second combining means to said comparing means for applying said second digital-synchronizing signal thereto.

3. The digital communication synchronization of claim 2 wherein, said receiver means further includes switch means coupled to said second combining means and said magnitude detection means, said switch means normally coupling said first digital synchronizing signal to said input stage of said second shift register means and blocking said second digital synchronizing signal therefrom, said switch means further being responsive to said synchronization control signal to couple said second digital synchronizing signal to said input stage of said second shift register means and block said first digital-synchronizing signal therefrom.

4. The digital communication synchronization system of claim 2 wherein, said adding means is an integrator.

5. The digital communication synchronization system of claim 4, wherein said output AND gate means is coupled to said magnitude detection means and separately to each of said plurality of stages of said second shift register means, said output AND gate means being responsive to a particular portion of said second digital-synchronizing signal stored in each of said plurality of stages of said second shift register means and said synchronization control signal to develop a synchronization start signal.

6. A system for synchronizing a communications system with a transmitted digital-synchronizing signal, including in combination, shift register means having a plurality of stages and an input stage, combining means coupled to at least two of said plurality of stages and to said input stage, said combining means being responsive to the data stored in said stages coupled thereto to develop a local digital-synchronizing signal, comparing means adapted to receive the transmitted digital-synchronizing signal and coupled to said combining means, said comparing means being responsive to the transmitted digital-synchronizing signal and said local digital-synchronizing signal to develop a first output signal wit the local and transmitted digital-synchronizing signals being the same and a second output signal with the local and transmitted digital-synchronizing signals being different, integrating means for adding said first output signals and subtracting said second output signals from said added signals to develop a first control signal magnitude detection means coupled to said adding means and responsive to said first control signal greater than a predetermined magnitude to develop a synchronization control signal, and output AND gate means coupled to said shift register means and to said magnitude detection means and responsive to said synchronization control signal and particular data stored in said shift register means to develop a synchronization start signal.

7. The digital communication synchronization system of claim 6, further including switch means coupling said combining means to said input stage and further coupled to said magnitude detection means, said switch means normally coupling said transmitted digital-synchronizing signal to said input stage and blocking said local digital-synchronizing signal therefrom, said switch means further being responsive to said synchronization control signal to couple said local digital-synchronizing signal to said input stage and block said transmitted digital-synchronizing signal therefrom.